US012735943B2

(12) United States Patent
Kelly

(10) Patent No.: US 12,735,943 B2
(45) Date of Patent: Sep. 15, 2026

(54) LADDER STEP EXTENSION PLATFORM

(71) Applicant: Brenden Kelly, Bethpage, NY (US)

(72) Inventor: Brenden Kelly, Bethpage, NY (US)

( * ) Notice: Subject to any disclaimer, the term of this patent is extended or adjusted under 35 U.S.C. 154(b) by 383 days.

(21) Appl. No.: 18/367,763

(22) Filed: Sep. 13, 2023

(65) Prior Publication Data

US 2025/0084698 A1 Mar. 13, 2025

(51) Int. Cl.
*E06C 1/393* (2006.01)
*E06C 7/16* (2006.01)

(52) U.S. Cl.
CPC .............. *E06C 1/393* (2013.01); *E06C 7/165* (2013.01)

(58) Field of Classification Search
CPC . E06C 1/393; E06C 7/165; E06C 7/16; E06C 7/14; E04G 2001/157
See application file for complete search history.

(56) References Cited

U.S. PATENT DOCUMENTS

| | | | | | |
|---|---|---|---|---|---|
| 335,051 | A * | 1/1886 | Ayres | E06C 7/165 | 182/120 |
| 407,079 | A * | 7/1889 | Laskey | E06C 7/16 | 24/716 |
| 467,685 | A * | 1/1892 | Hammon | E06C 1/32 | 182/116 |
| 897,929 | A * | 9/1908 | Ridout | E06C 7/165 | 182/120 |
| 1,155,125 | A | 9/1915 | Blakenhagen | | |
| 1,285,817 | A * | 11/1918 | Sklar | E06C 7/165 | 182/120 |
| 1,454,750 | A | 5/1923 | Flohic | | |
| 1,578,529 | A * | 3/1926 | Kramer | E06C 7/16 | 248/238 |
| 1,702,249 | A | 2/1929 | Davidson | | |

(Continued)

FOREIGN PATENT DOCUMENTS

| | | |
|---|---|---|
| CA | 2815004 A1 | 11/2014 |
| CA | 3008296 A1 | 10/2019 |

(Continued)

OTHER PUBLICATIONS

Little Giant Ladder Systems, "Platform Pro Instructions", 84007 VO 12.21(1) (Dec. 2021).

(Continued)

*Primary Examiner* — Colleen M Chavchavadze
*Assistant Examiner* — Benjamin Alexander Pezzlo
(74) *Attorney, Agent, or Firm* — Hoffmann & Baron, LLP

(57) ABSTRACT

A step extension platform for attachment to a ladder step having a step including a main body having a platform for supporting a user thereon. A first segmented portion is secured to the platform by a first hinge, and the first hinge has an axis of rotation extending along a width of the platform. A second segmented portion is secured to the second segmented portion by a second hinge, and the second hinge has an axis of rotation extending along the width of the platform. The platform, the first and the segmented portions each being pivotal between an open storage position and a closed working position to form a step channel adapted to surround and accommodate the ladder step. A bracket is secured to the second segmented portion and defines a space adapted to contain at least a portion of the ladder step.

21 Claims, 6 Drawing Sheets

(56) References Cited

U.S. PATENT DOCUMENTS 1,714,028 A * 5/1929 Knuth ..................... E06C 7/165 182/120
1,817,760 A * 8/1931 Peters ..................... E06C 1/393 182/125
1,890,763 A * 12/1932 Wilson .................... E06C 7/165 182/120
1,984,655 A * 12/1934 Rassmussen ............. E06C 1/32 182/216
2,015,378 A * 9/1935 Davis ........................ E06C 7/14 182/195
2,066,108 A * 12/1936 Hedges ................... E06C 7/165 182/120
2,103,603 A * 12/1937 Voigt ........................ E06C 7/08 182/120
2,104,987 A * 1/1938 Harding .................... E06C 7/16 248/238
2,136,354 A * 11/1938 Welsh .................... A47C 12/02 182/120
2,148,958 A * 2/1939 Myers ....................... E06C 7/16 182/120
2,237,216 A * 4/1941 Dubreuil ................. E06C 7/165 182/120
2,415,327 A * 2/1947 Yothers ................... E06C 7/165 182/120
2,444,096 A * 6/1948 Faust ........................ E06C 7/16 182/120
2,467,424 A * 4/1949 Bucher ..................... E06C 7/16 248/238
2,486,783 A 11/1949 Hartman et al.
2,548,380 A * 4/1951 Latham ..................... E06C 7/16 248/238
2,585,150 A * 2/1952 Mcgill .................... E06C 7/081 182/120
2,726,901 A * 12/1955 Newman ................ E06C 7/165 182/120
2,730,412 A * 1/1956 Yoder ....................... E06C 1/38 182/120
2,804,355 A * 8/1957 Bartley ................... E06C 7/165 182/120
2,805,104 A * 9/1957 Ross ....................... E06C 7/165 182/120
2,827,336 A * 3/1958 Johnson .................. E06C 7/165 182/120
2,899,011 A * 8/1959 Babits ..................... E06C 7/165 182/120
2,941,617 A 6/1960 Stiffler
2,993,672 A * 7/1961 Bower ..................... B44D 3/14 248/312.1
3,078,950 A * 2/1963 Schramm ................ E06C 7/165 182/120
3,112,811 A 12/1963 Moran
3,220,682 A * 11/1965 Hannon .................. E06C 7/146 248/303
3,294,197 A * 12/1966 Kwiatkowski ............ E06C 7/16 182/120
3,422,923 A * 1/1969 Lund ......................... E06C 7/14 182/20
3,556,254 A * 1/1971 Lambert ................... E04G 5/08 182/223
3,842,936 A * 10/1974 De Luca ................... E06C 7/14 108/26
4,016,955 A * 4/1977 Gates ........................ E06C 7/14 182/122
4,184,666 A * 1/1980 Boitz ...................... B25B 1/205 269/95
4,331,217 A 5/1982 Stecklow
4,332,308 A * 6/1982 Larson ...................... E06C 7/16 182/120
4,437,544 A * 3/1984 Anderson ............... E06C 7/165 182/120
4,460,063 A * 7/1984 Casada ..................... E06C 7/14 182/116
4,482,030 A * 11/1984 Lincourt ................... E06C 7/16 248/238
4,586,586 A 5/1986 Canals
D290,931 S * 7/1987 Powell ........................... D8/371
D296,321 S * 6/1988 Hayes ............................ D25/68
4,768,620 A * 9/1988 South ...................... E04G 1/152 108/65
4,800,988 A 1/1989 Dunmore
4,909,351 A 3/1990 Johnson et al.
4,911,265 A 3/1990 Skaggs
5,005,668 A * 4/1991 Nowlan .................... E06C 7/16 248/238
5,056,620 A * 10/1991 Zumwalt ................ E06C 7/165 182/120
5,060,755 A * 10/1991 Bourdages ................ E06C 7/16 248/238
5,072,808 A 12/1991 Spalt et al.
5,337,857 A * 8/1994 Spalt ....................... E06C 7/165 182/120
D353,469 S * 12/1994 Skaggs .......................... D25/68
D354,431 S * 1/1995 Andrews ........................ D8/367
5,544,718 A * 8/1996 Schumacher ............. E06C 7/14 182/141
D390,669 S 2/1998 Armstrong et al.
5,779,208 A * 7/1998 McGraw ................ E06C 7/165 182/120
5,836,420 A * 11/1998 Marky, Jr. ................. E06C 7/16 248/238
5,873,433 A * 2/1999 Katz ......................... E06C 7/14 248/210
5,931,257 A * 8/1999 Harden ................... E06C 7/081 182/92
5,975,240 A * 11/1999 O'Brien .................. E06C 7/165 182/120
6,089,351 A * 7/2000 Ahl ........................... E06C 7/14 248/210
6,412,601 B1 * 7/2002 Schmidt .................... E06C 7/14 182/120
6,443,260 B1 * 9/2002 Katz ......................... E06C 7/14 248/238
6,467,577 B1 * 10/2002 Charlebois, Jr. .......... E06C 7/14 248/210
6,662,838 B1 * 12/2003 Graham, III ........... B25H 1/005 144/286.5
6,786,300 B1 * 9/2004 Bonifacini .............. E06C 7/165 182/120
6,966,406 B2 11/2005 Nash, Jr.
7,032,711 B1 * 4/2006 Katz ........................ B25H 3/06 248/238
D523,156 S * 6/2006 Skaggs .......................... D25/68
7,370,726 B1 * 5/2008 Chavez ..................... E06C 1/18 248/210
7,578,371 B2 * 8/2009 Allred, III ............ E04F 11/064 182/163
8,657,070 B2 2/2014 O'Brien et al.
8,662,250 B2 3/2014 Kennedy
8,672,279 B2 * 3/2014 Schirmacher ............. E06C 7/14 108/26
8,727,074 B1 * 5/2014 Bhajan .................... E06C 7/165 182/120
8,925,684 B1 * 1/2015 Medina ................... E06C 7/165 182/120
9,428,958 B1 * 8/2016 Ellis .......................... E06C 7/14
D788,328 S * 5/2017 Mittag ........................... D25/68
D791,972 S * 7/2017 Goodnow ...................... D25/68
9,777,535 B1 10/2017 Stentiford, Sr.
9,834,988 B1 * 12/2017 Arduna ................... E06C 7/165
10,006,248 B2 * 6/2018 Goodnow ................. E06C 7/16
10,352,098 B2 * 7/2019 Frensley ................. E06C 7/165
10,358,832 B1 * 7/2019 Wagner ................... E04G 5/003
10,538,966 B2 * 1/2020 Woodward .............. E06C 1/393
11,053,737 B2 * 7/2021 Enloe ...................... E06C 7/181
11,142,950 B2 10/2021 Miller
11,162,267 B1 * 11/2021 Santini ...................... E04G 5/08
D940,900 S * 1/2022 Godett ........................... D25/68
11,603,707 B2 * 3/2023 Carver .................... E06C 7/188
D1,004,799 S * 11/2023 Swier ............................ D25/68

(56) References Cited

U.S. PATENT DOCUMENTS

| | | | | |
|---|---|---|---|---|
| D1,082,052 | S * | 7/2025 | Goneau | D25/68 |
| 12,486,719 | B2 * | 12/2025 | Park | E06C 7/081 |
| 2004/0163890 | A1 * | 8/2004 | Nash, Jr. | E06C 7/16 182/122 |
| 2004/0163891 | A1 * | 8/2004 | Craig | E06C 7/16 248/238 |
| 2005/0224287 | A1 * | 10/2005 | LaBrash | E04G 5/10 182/84 |
| 2006/0169539 | A1 * | 8/2006 | Grebinoski | E04G 1/15 182/223 |
| 2007/0068732 | A1 * | 3/2007 | Nagle | E06C 7/16 182/121 |
| 2008/0142300 | A1 * | 6/2008 | Roberge | E06C 7/14 182/129 |
| 2009/0173704 | A1 * | 7/2009 | Kotajarvi | B60R 9/06 211/88.04 |
| 2011/0168493 | A1 * | 7/2011 | Clark | E06C 7/14 182/129 |
| 2011/0297482 | A1 * | 12/2011 | O'Brien | E06C 7/165 182/129 |
| 2014/0326538 | A1 * | 11/2014 | Najey | E06C 7/08 182/129 |
| 2016/0177626 | A1 * | 6/2016 | Miller | E06C 7/14 396/419 |
| 2016/0348433 | A1 * | 12/2016 | Goodnow | E06C 7/16 |
| 2016/0369561 | A1 * | 12/2016 | Jones | E06C 7/165 |
| 2016/0376844 | A1 * | 12/2016 | Najey | E06C 7/165 182/120 |
| 2017/0130530 | A1 * | 5/2017 | Lawler | E06C 7/14 |
| 2017/0298692 | A1 * | 10/2017 | Knapp | E06C 7/16 |
| 2018/0094487 | A1 * | 4/2018 | Ellis | E06C 7/14 |
| 2019/0145171 | A1 * | 5/2019 | Frensley | E06C 7/165 182/120 |
| 2019/0186202 | A1 * | 6/2019 | Rodriguez | E06C 7/084 |
| 2019/0292850 | A1 * | 9/2019 | Weyrauch | E06C 7/50 |
| 2021/0115733 | A1 * | 4/2021 | Textor | E06C 7/165 |
| 2021/0363823 | A1 * | 11/2021 | Swier | E06C 7/081 |
| 2024/0183222 | A1 * | 6/2024 | Mittanck | E06C 1/16 |
| 2024/0384595 | A1 * | 11/2024 | Boyington | E06C 7/16 |

FOREIGN PATENT DOCUMENTS

| | | | | |
|---|---|---|---|---|
| CA | 3152159 | A1 * | 9/2023 | |
| DE | 3607348 | C * | 9/1987 | |
| DE | 202019003240 | U1 * | 8/2019 | E06C 7/165 |
| EP | 2218868 | A1 * | 8/2009 | E06C 7/085 |
| EP | 3088653 | A1 * | 11/2016 | E06C 1/20 |
| EP | 3805484 | A2 * | 4/2021 | E04G 1/152 |
| FR | 2837234 | A1 * | 9/2003 | E06C 7/165 |
| GB | 2353320 | A * | 2/2001 | E04G 5/08 |
| GB | 2362181 | A * | 11/2001 | E06C 7/165 |
| GB | 2374378 | A * | 10/2002 | E06C 7/165 |
| GB | 2443473 | A * | 5/2008 | E04G 5/08 |
| GB | 2448199 | A * | 10/2008 | E04G 7/28 |
| GB | 2501244 | A * | 10/2013 | E06C 7/16 |
| WO | WO-0104437 | A1 * | 1/2001 | E04G 1/152 |
| WO | WO-0123687 | A1 * | 4/2001 | E04G 1/152 |
| WO | WO-2005014954 | A1 * | 2/2005 | E04G 5/08 |
| WO | WO-2015063467 | A1 * | 5/2015 | E06C 7/081 |

OTHER PUBLICATIONS

Amazon search results "ihomepark work platform," dated Sep. 12, 2023 (https://www.amazon.com/Ladder-Platform-Accessory-System-Accessories/dp/B07NY8YGTP/ref=sr_1_2?crid=19WM6CFTZQALO&keywords=ihomep%E2%80%A6).

Stan•E•Z web page, "Work Ladder Platform," Ladder Platforms International, Inc., Copyright 2006. (The Wayback Machine- https://web.archive.org/web/20081121030737/http://www.stanex.com/).

* cited by examiner

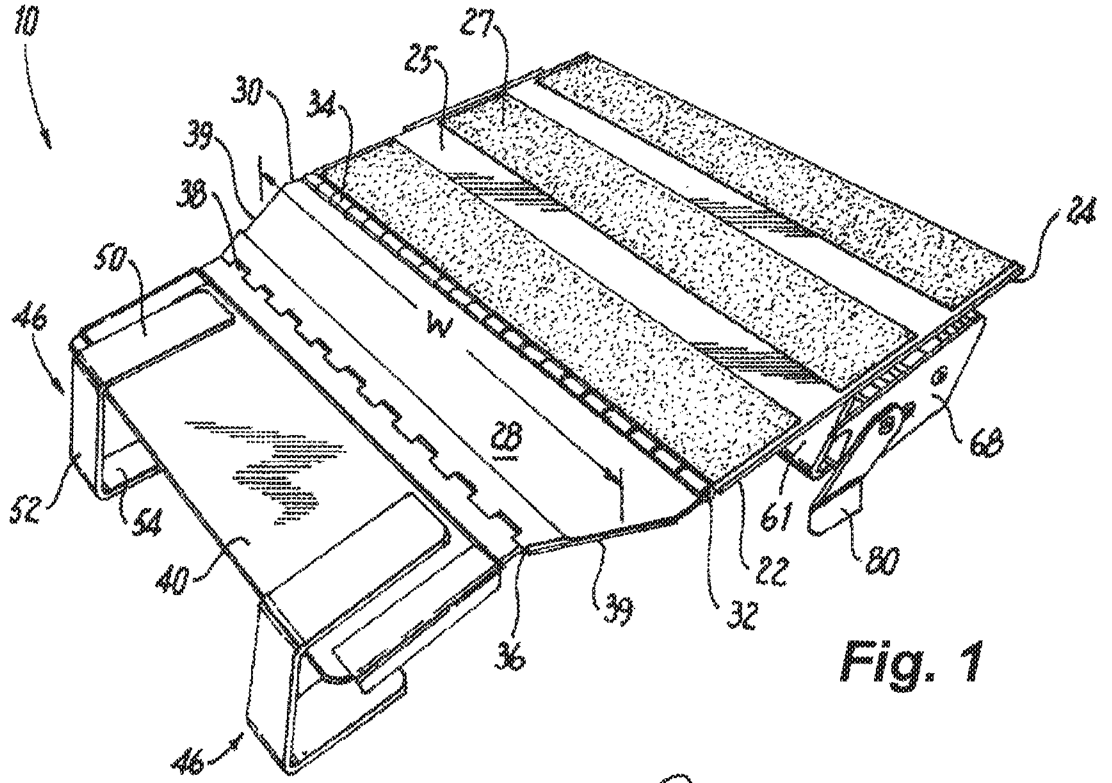
Fig. 1
Fig. 2
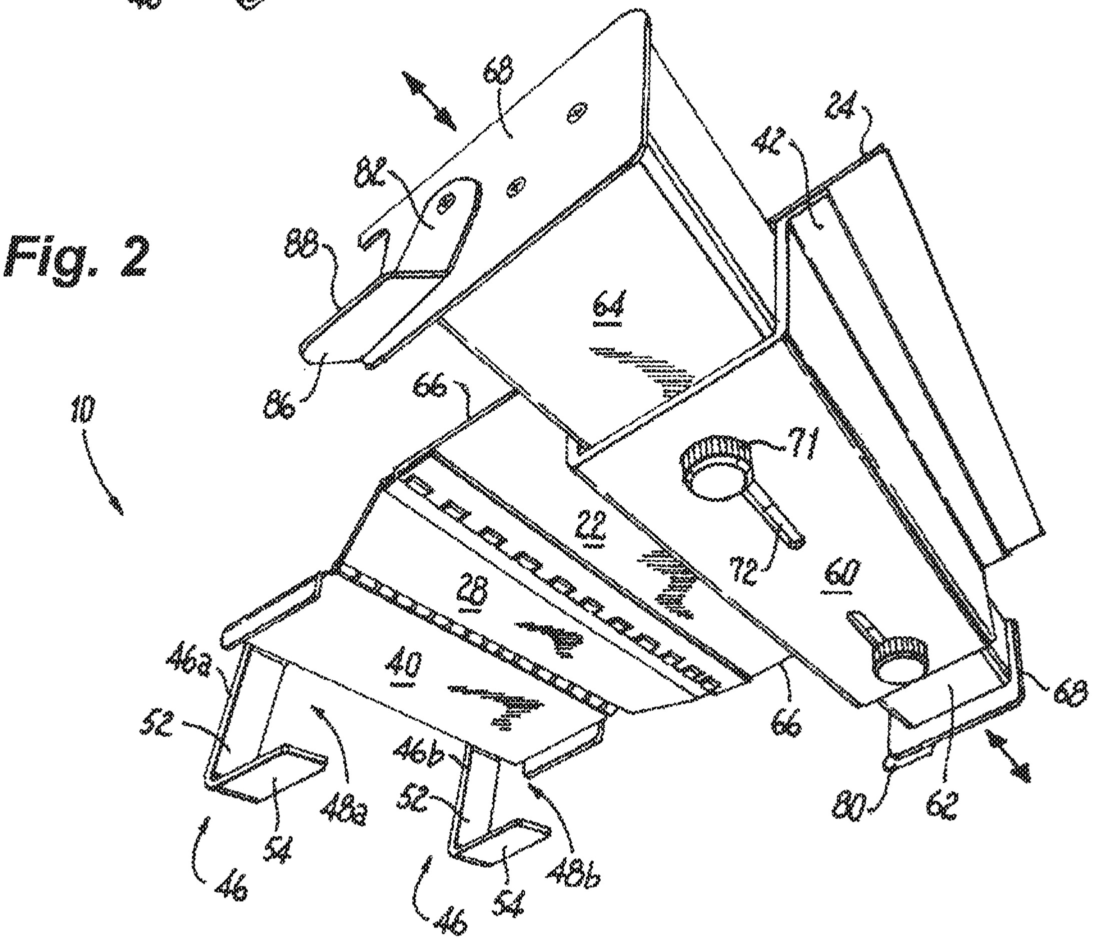

Fig. 8
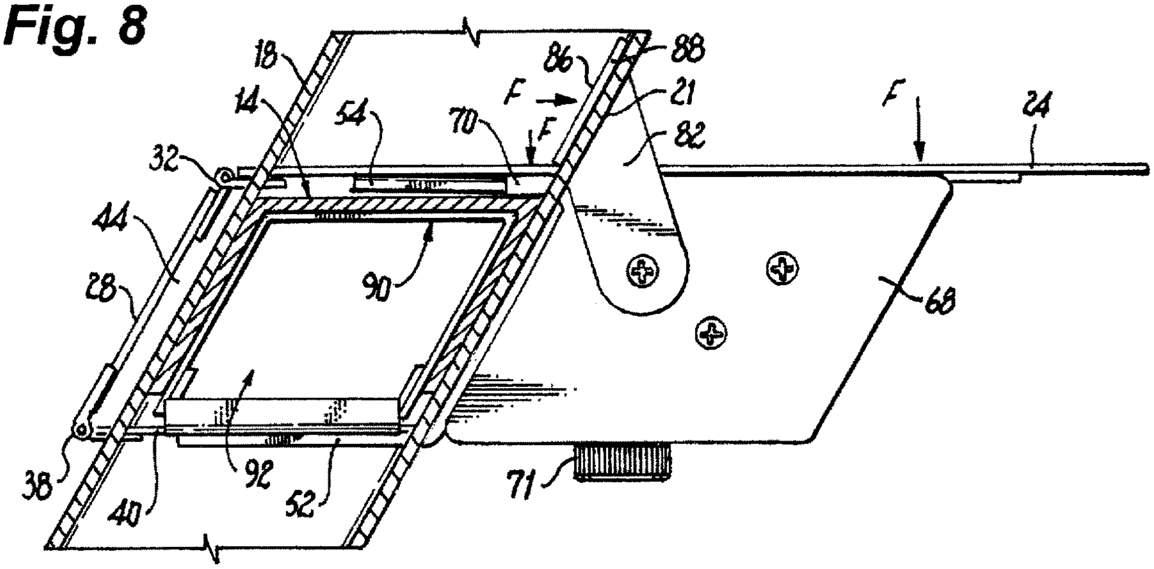
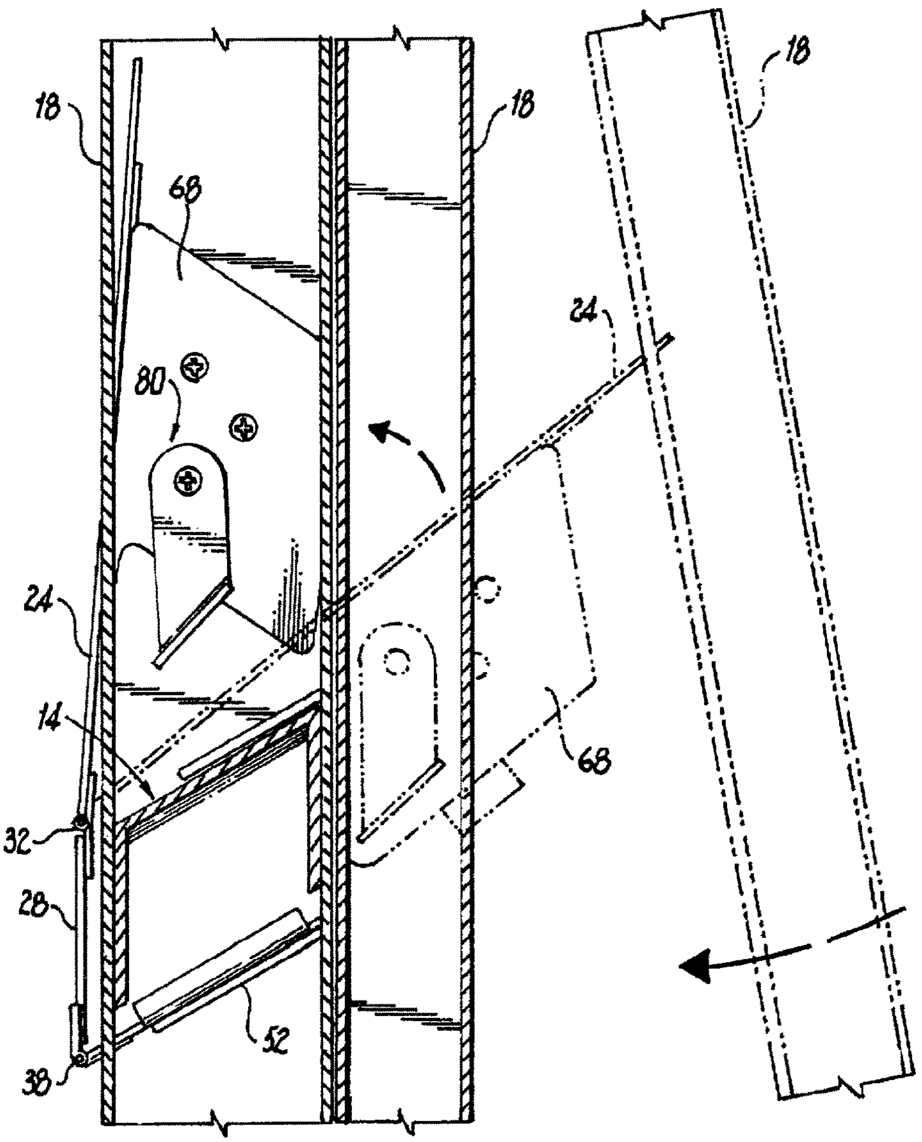
Fig. 9

LADDER STEP EXTENSION PLATFORM

FIELD OF THE DISCLOSURE

The present disclosure relates to a ladder step extension platform, and more particularly, to a device attachable to a ladder step to provide increased standing area.

BACKGROUND

Ladders, and in particular A-frame ladders, have two side rails hinged together. The section are unfolded for use and folded for storage and transportation. The ladders include a number of steps for supporting a user; however, the steps are typical shallow in depth and only support a portion of a user's feet.

In certain trades, a user can stand on a ladder for hours a day as they install ceilings, install electrical wiring and fixtures, or paint ceiling or upper wall portions. The limited depth of the steps puts increased pressure on the user's feet making it uncomfortable. In addition, the limited depth restricts a user's ability to adjust their position while on the ladder. Therefore, the user has to frequently come down the ladder and reposition it.

Devices for attachment to a ladder step for extending its width are know in the art. However, such devices can be unstable when in use since the have limited engagement with the ladder. In addition, they need to be separated from the ladder during storage and transportation. This increases the likelihood that the device will be lost or misplaced.

Accordingly, it would be desirable to provide a device that is attachable to a ladder step that increases the standing area and that can remain attached to the ladder when the ladder is folded into the storage position.

SUMMARY

The present disclosure provides a step extension platform for attachment to a ladder step having a step. The step extension platform includes a main body having a platform for supporting a user thereon. A first segmented portion is secured to the platform by a first hinge, and the first hinge has an axis of rotation extending along a width of the platform. A second segmented portion is secured to the second segmented portion by a second hinge, and the second hinge has an axis of rotation extending along the width of the platform. The platform, the first and the second segmented portions each being pivotal between an open storage position and a closed working position to form a step channel adapted to surround and accommodate the ladder step. A bracket is secured to the second segmented portion and defining a space adapted to contain at least a portion of the ladder step.

The present disclosure also provides a step extension platform for attachment to a ladder step having a step including a main body having a platform for supporting a user thereon. An extension member is translatably secured to the main body and translatable between a retracted and an extended position, wherein the first extension member projects beyond a width of the platform. A first segmented portion is secured to the platform by a first hinge. The first hinge has an axis of rotation extending along a width of the platform. A second segmented portion is secured to the second segmented portion by a second hinge. The second hinge has an axis of rotation extending along a width of the platform. A bracket is secured to the second segmented portion and defines a space adapted to contain at least a portion of the ladder step. The first and second segmented portions are pivotal between an open storage position and a closed working position in which step channel, adapted to surround and accommodate the ladder step, is formed. The platform in the working position is generally parallel with the step surface, and the platform in the storage is generally perpendicular to the step surface.

The present disclosure further provides a method of securing a step extension to a ladder having a step supported between two side rails comprising:

- obtaining a step extension having a main body having a platform for supporting a user thereon; a first segmented portion secured to the platform by a first hinge, the first hinge having an axis of rotation extending along a width of the platform; a second segmented portion secured to the second segmented portion by a first hinge, the first hinge having an axis of rotation extending along a width of the platform; the platform, the first and segmented portions being pivotal between an open storage position and a closed working position to form a step channel adapted to surround and accommodate the ladder step; and a bracket secured to the second segmented portion and defining a space adapted to contain at least a portion of the ladder step;
- placing the bracket around a ladder step; and
- rotating the platform relative to the first and second segmented portions until the main body engages the bracket and the platform extends across a top of the ladder step and the platform is parallel to a top surface of the ladder step.

BRIEF DESCRIPTION OF THE DRAWINGS

FIG. 1 is a perspective top view of a ladder step extension platform shown in an open position.

FIG. 2 is a bottom perspective view of the ladder step extension platform shown in the open position with extension wings extending outwardly.

FIG. 8 is cross-sectional view taken through line 8-8 of FIG. 5.

FIG. 9 is cross-sectional view taken through line 9-9 of FIG. 7.

DETAILED DESCRIPTION

Figure 5:
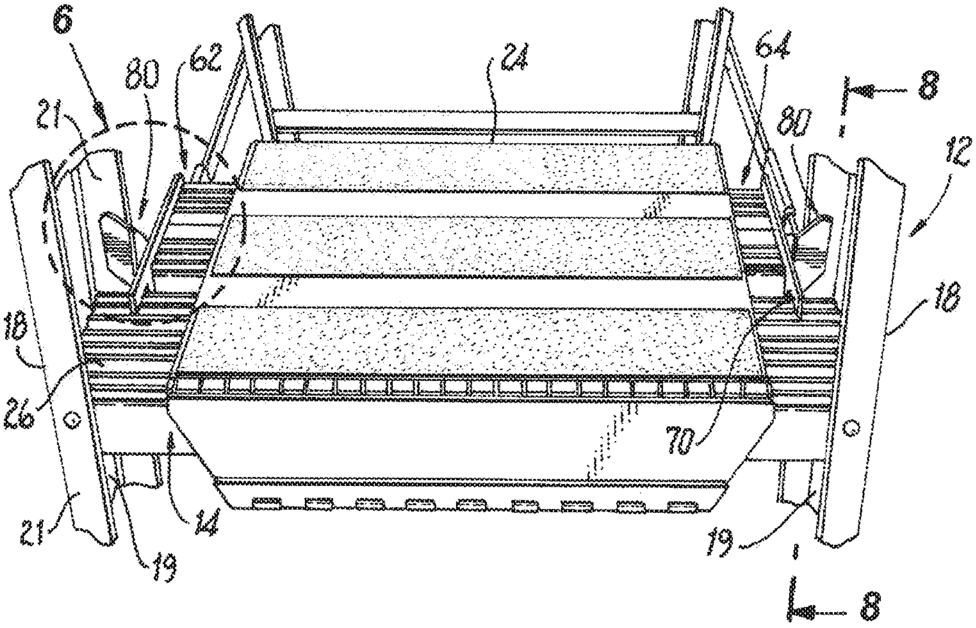
FIG. 5 is a top perspective view of the ladder step extension platform attached to a ladder and shown in the operating position.
Figure 6:
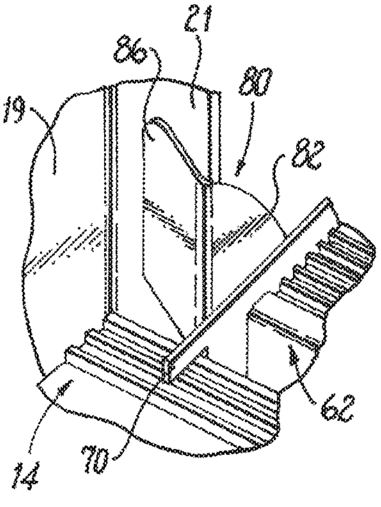
FIG. 6 is detailed view of a latch engaging a ladder rail.
Figure 7:
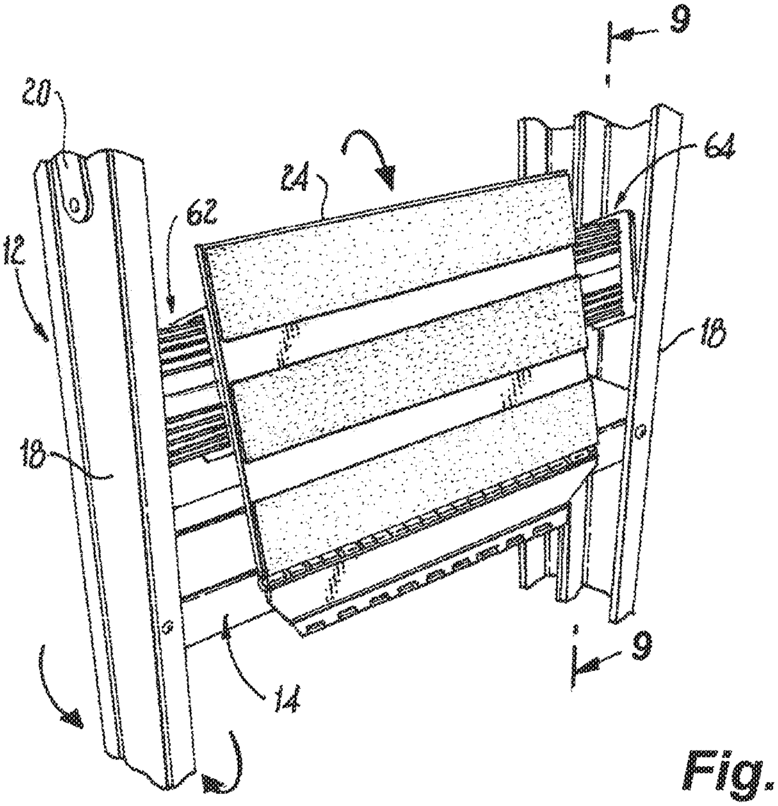
FIG. 7 a top perspective view of the ladder step extension platform attached to a ladder and shown in the storage position.
Figure 10:
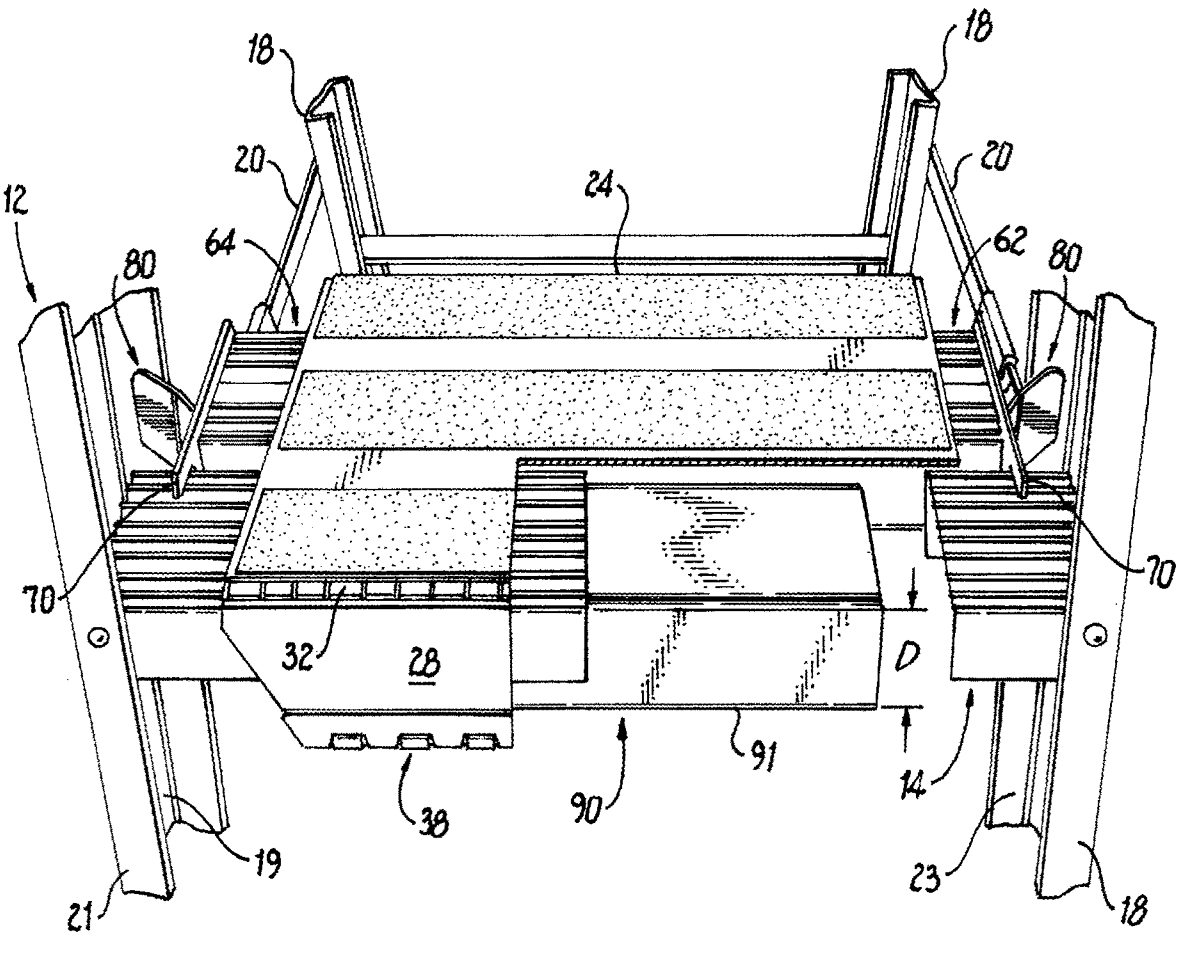
FIG. 10 is a top perspective view of the ladder step extension platform attached to a ladder and shown in the operating position with a portion of a platform and a step removed for illustrative purposes.

With reference to FIGS. 1, and 5-7, a step extension platform 10 for use with a ladder 12 is shown. The step extension 10 may be removably secured to a step 14 or rung of a standard A-frame ladder 12 and provides an increased standing area to make working on the ladder more comfortable and steady. The ladder 12 may be a typical A-frame ladder having top cap 16 from which side rails 18 are pivotally attached. The side rails 18 have a generally U-shaped cross-section with a back wall 19 and two side walls 21 extending orthogonally outwardly therefrom to form a channel 23. A plurality of steps 14 extends between, and are secured to, the side rails 18. Spreaders 20 extend between the side rails 18 to permit the ladder 12 to be retained in an open position and then folded at a pivotally connected mid-section to a closed storage position in a manner well known in the art. The step extension 10 may be secured to a ladder in an operating position, providing a standing surface for a user, as shown in FIGS. 5, 8 and 10 and selectively moved to a storage position as shown in FIGS. 7 and 9.

With reference to FIGS. 1-5, the step extension 10 includes a main body 22 having a rigid planar platform 24 that provides a standing surface 25 for a user. The platform 24 is larger in area than the ladder step's top standing surface 26. Therefore, the user's feet are more fully supported. The platform 24 may include a nonslip element 27 such as friction tape, or other nonslip element, to increase the traction between the user and the platform 24.

The main body 22 has a first segmented portion 28 having a first edge 30 pivotally secured by a first hinge 32 to a platform edge 34. The first segmented portion 28 has a planar configuration and has a width W that tapers inwardly at as it extends from the platform 24. This taper 39 provides clearance for ladder step braces found on some ladders. The first segmented portion 28 has a second edge 36 pivotally secured by a second hinge 38 to a second segmented portion 40. In one embodiment, the first and second hinges 32 and 38 may be piano-style continuous hinges that extend along the length of the joined edges. The second segmented portion 40 has a planar configuration and has the same or similar width as the width of the end of the first segmented portion 28 to which it is attached. The first and second segmented portions 28 and 40 rotate relative to each other and the platform 24 such that the second segmented portion 40 can be moved into an opposed spaced relation to a platform undersurface 42. When the platform 24 is in this position, a step channel 44 is formed for accommodating a ladder step 14 to extend there through when the step extension 10 is secured to the ladder. The platform 24 and first and second segmented portions 28 and 40 may be formed of steel, aluminum or other rigid material.

With reference to FIGS. 1 and 2, the second segmented portion 40 includes bracket 46 having a J-shaped cross-section profile which hooks around a ladder step 14. The bracket 46 may include two spaced bracket elements **46*a* and 46*b*, each forming a step receiving space 48*a* and 48*b*, respectively to accommodate the step 14 therein. Alternatively, the bracket 46 may include a single elongate member (not shown) extending along a portion of the width of the second segmented portion and having a L or J shaped cross-sectional profile that forms a space 48 for receiving the step 14. The bracket 46 performs the function of removably attaching the step extension 10 to a ladder step 14 and for securing the step extension 10 in an operating position as will be described below. In both embodiments, the bracket 46 has a first extent 50 fixedly secured to the second segmented portion 40. A bracket second extent 52 projects from the first extent 50 upwardly away from the second segmented portion 40. The second extent 52 forms an obtuse angle with the first extent 50. A third bracket extent 54 projects from the second extent such that it is in opposed spaced relation to the first extent 50. The third extent 54 may have a length greater than a length of the first extent 50. The three bracket extents 50, 52 and 54 form the step receiving space 48**.

With reference to FIGS. 3, 4, 8, and 10, a spacer 90 may be disposed under the step 14 and project downwardly therefrom. The spacer 90 may have a generally parallelogram cross-section and be sized to fit in a step recess 92 formed on the undersurface of the step 14. Such recesses 92 are typically present in metal steps found on A-frame ladders. The spacer 90 provides a uniform distance D between the top of the step and the bottom of the spacer 91. This distance corresponds to a distance between the undersurface of the brackets second extends 52 and the second segmented portion 40 between which the spacer 90 is received. In this way, should a particular ladder have different step dimensions, the spacer 90 provides a uniform dimension so that the step extension 10 will be securely held in place on the ladder step 14 to which it is attached. When the step extension 10 is rotated in in the operating position so that is may stood upon by a user, the spacer 90 is sandwiched between the second segmented portion 40 and the step undersurface as shown in FIGS. 8 and 10.

With reference to FIGS. 2-4, and 10, the main body 22 includes a wing housing 60 formed on the platform undersurface 42 for holding a first extension wing 62 and a second extension wing 64. The first and second extension wings 62 and 64 each translate outwardly from the platform side edges 66 in opposed directions along the same linear axis L-L. Thus, when the first 62 and second 64 wings are extended, they project beyond the width of the platform 24 and provide additional standing area upon which a user can stand. The wing top surface may have ridges or other slip resistant features to aid in providing sure footing for a user. The distal ends of each of the wings include an end plate 68 secured thereto. Each end plate 68 has a lug 70 projecting therefrom. The lugs 70 project perpendicular to the length of the wings 62, 64 and engage the step top standing surface 26 on which the step extension 10 is secured. This engagement provides additional support for the wings 62 and 64 and platform when they are stood upon as will be described further below.

The first and second wings 62 and 64 are each extendable and retractable relative to the main body 22. Retention devices 70 71, such as fasteners, are disposed between the wing housing 60 and each wing to selectively fix the position of the first and second wings 62, 64 relative to the housing 60. In one embodiment, the wing housing 60 includes a pair of longitudinally extending slots 72, one for each wing, and a threaded member 74 extends from the fastener through the slot 72 and into an internally threaded bushing (not shown) secured to each wing. Each threaded member 70 74 rides along its respective slot 72 as the wings are extended. The fastener 70 71 may be turned to selectively lock the wings 62, 64 in place and then unlocked them to permit the wings to extend outwardly, as shown, e.g., in FIG. 10, and retract into the wing housing 60 as shown, e.g., in FIG. 4.

With reference to FIGS. 3-6, the wings 62 and 64 each include a latching member 80 pivotally secured to the endplates 68. The latching members 80 have a generally L-shaped configuration, with a first leg 82 secured to the endplate 68 by a fastener 84 that permits the latching member 80 to rotate relative to the endplate 68. Extending orthogonally outwardly from each first leg 82 is a second leg 86 having a flat abutment surface 88. Each second leg 86 is sized such that it extends into the side rail channel and abuts against the side rail wall 21. When a user steps on the device 10, the second leg abutment surfaces 88 are urged against their respective rail side walls 21. This engagement resists platform rotational movement or platform flexing when the platform 24 is stood upon by the user. For example, the engagement restricts the platform from pivoting around the step 14. Such motion is also resisted by the lugs 70 that abut against the step top surface 26 as shown in FIGS. 5 and 8. Thus, the platform 24 is securely braced on the ladder, and it does not move when stepped upon by a user.

Figure 3:
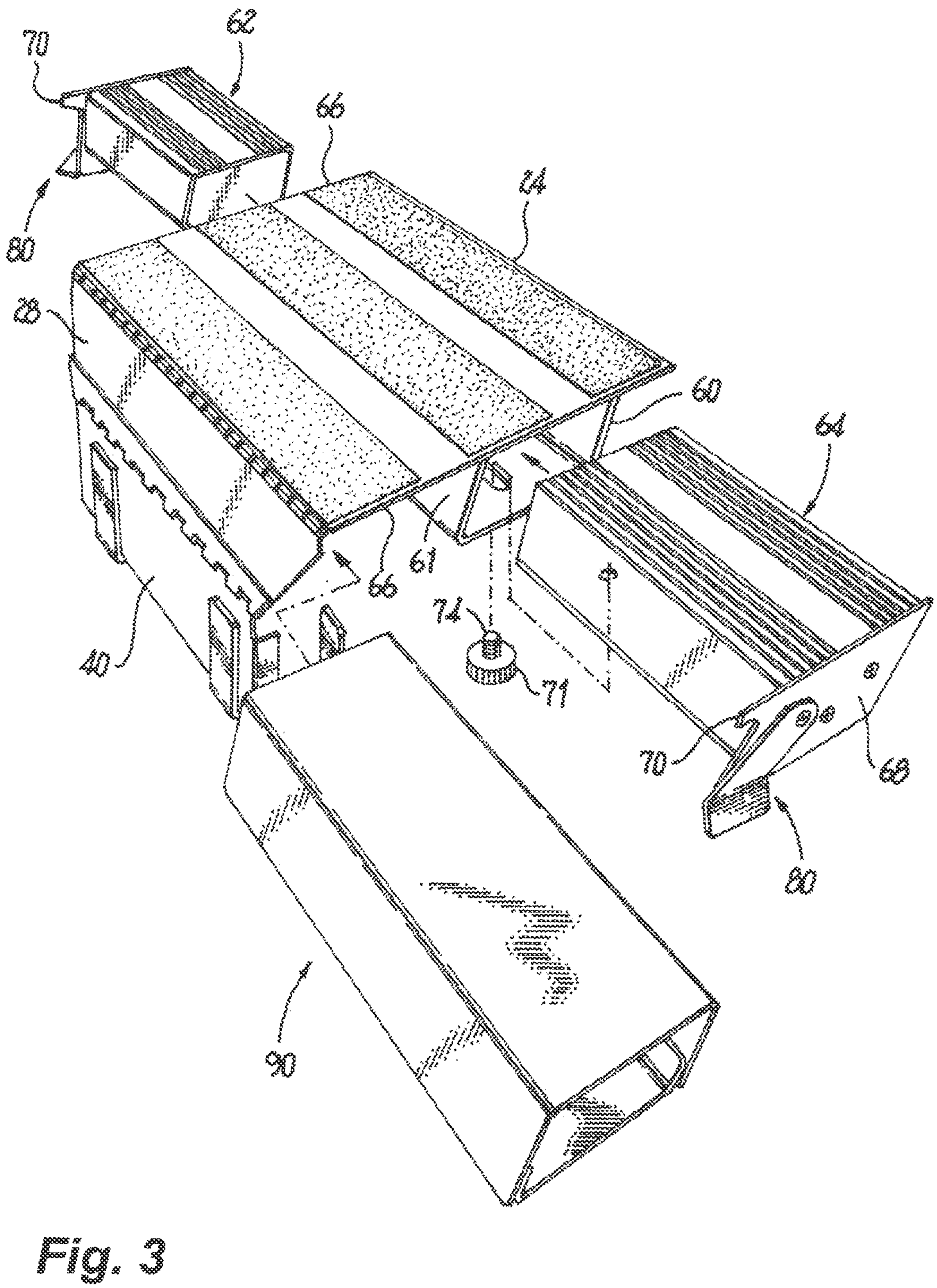
FIG. 3 is a perspective exploded view of the ladder step extension platform and a spacer.
Figure 4:
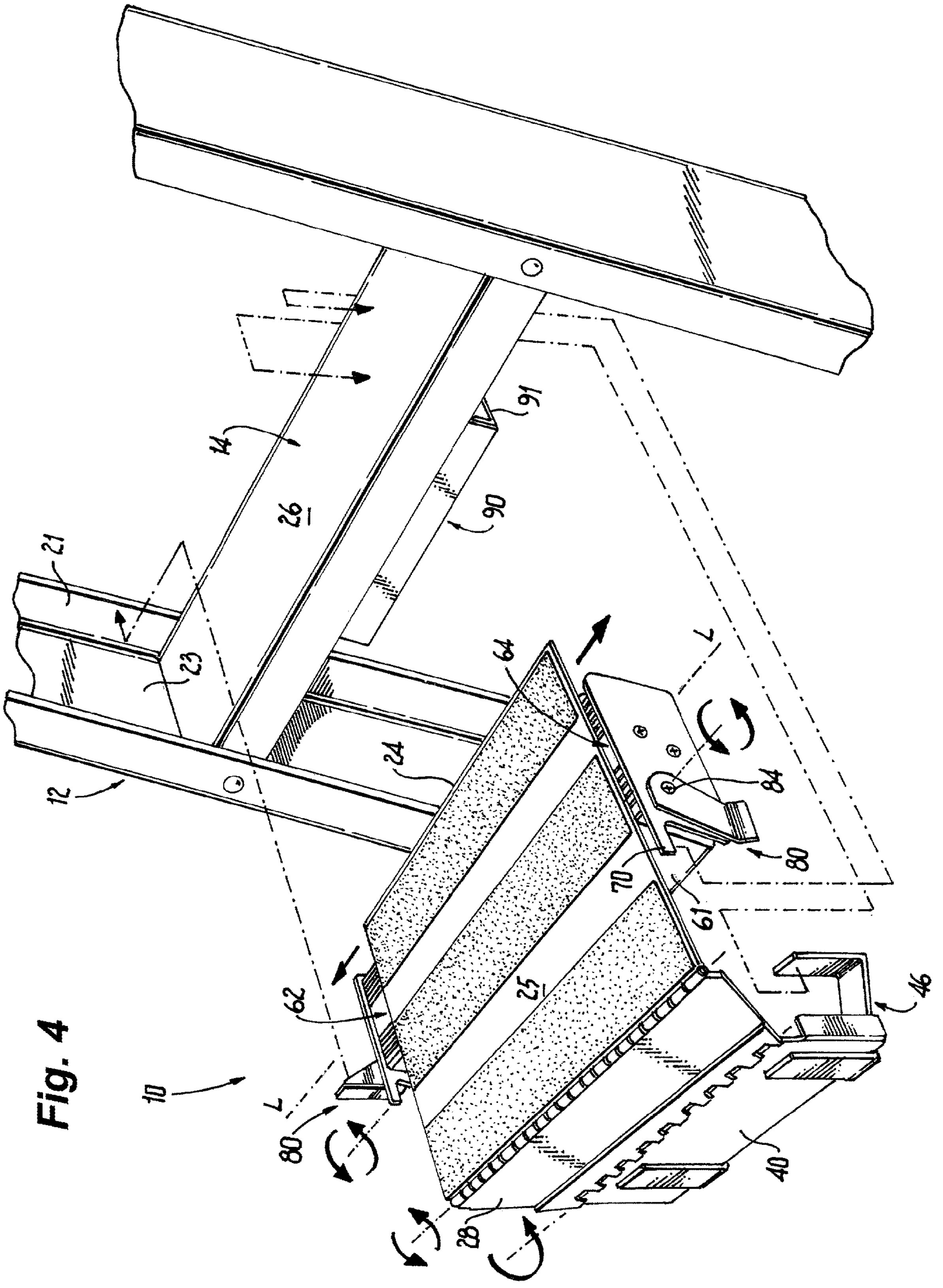
FIG. 4 is a top perspective view of the ladder step extension platform prior to attachment to a ladder.

A manner in which the extension step platform 10 is secured to a ladder step 14 will now be described with particular reference to FIGS. 4 and 10. The spacer 90 may be place beneath the step 14 to which the step extension 10 is to be attached. In some cases depending on the step, the space may be held in the space by a close frictional fit with the step. The first and second segmented portions are pivoted away from the main body 22. The ladder step 10 to which the device is to be secured is slid into the step receiving space 48 formed by the bracket 46. The second segmented portion 40 is then rotated toward the main body 22 such that the main body and first and second segmented portions 28 and 40 wrap around and capture the step 14 and the spacer 90 disposed beneath the step 14 as shown in FIGS. 8 and 10. The bracket second extent 52 resiliently engages a side wall 61 of the wing housing (FIG. 3) and snaps into a closed position. The side wall 61 may be formed at an incline such that the side wall 61 forms an acute angle with the bottom of the platform as shown in FIGS. 3 and 8.

When in the closed or working position, the bracket second extent 52 lies against the side wall 61 and the third bracket extent 54 abuts against the platform undersurface 42 as shown in FIG. 8. The second segmented portion 40 lies against the bottom of the insert 90. In this closed or working position, the step extension platform 10 is retained on the step 14 and the platform 24 and step top surface 26 are parallel to each other and generally lie in the same plane. The platform 24 is in a generally horizontal operating position. The step channel is configured such that when the step extension platform is secured to the step 14, the platform 24 does not rotate relative to the step 14. The platform 24, therefore, provides an area, greater than that provided by the step alone, upon which a user can comfortably stand and perform their necessary work.

In order to further increase the standing area, a user may extend the wings 62 and 64 outwardly until they abut the ladder side rails 18. The lugs 70 rest on the top of to the ladder step as shown in FIGS. 5 and 10. When extended, the user may tighten the fastener 74 in order to lock the wings 62, 64 in the extended position. When a user steps on the platform 24, the lugs 70 are brought into forced engagement with the step 14 and they resist any downward rotation of the platform 24. The latching members 80 may then be rotated in place such that they engage the side rail walls. The latching members 80 further resist movement of the platform 24 caused by the weight of the user.

After a user has completed their work, they can fold the ladder 12 to the closed position while keeping the step extension platform 10 secured to the ladder as shown in FIGS. 7 and 9. The step extension platform 10 has a storage position, in which it is retained on the ladder, but permits the ladder 12 to be folded into its closed position. To move the step extension platform to the storage position, the platform 24 is rotated from its generally horizontal position away from the step 14, approximately 90 degrees, until the wings 62 and 64 align with the ladder side rails 18. The wings 62, 64 are then extended outwardly to engage the side rails 18. For ladders in which the side walls have a U-shaped profile and form a channel 23, the wings are extended until the ends of the wings sit within the channels 23. The engagement between the wings 62, 64 and the side rail side walls 21 retain the platform 24 in a position in which it lies generally vertically between two ladder steps. In this position, the step extension platform 10 does not extend beyond the side rails 18 and the ladder 12 can be placed in the closed position. This permits the ladder 12 to be transported and stored with the step extension platform 10 attached to the ladder where it is ready to be employed the next time the ladder 12 is to be used.

When a user desires to use the ladder 12 again, they can retract the first and second extension wings 62 and 62 and rotate the platform 24 to the horizontal working position such that the bracket second extent 52 resiliently engages a side wall 61 of the wing housing (FIG. 3) and snaps into a closed position. The extension wings 62, 64 can then be extended and the latching members 80 rotated to abut against the adjacent side rail wall 21 as described above.

It will be appreciated that various forms of the above-disclosed features and functions, or alternatives thereof, may be desirably combined into many other different apparatus and systems. It will also be appreciated that various presently unforeseen or unanticipated alternatives, modifications, variations, or improvements therein may be subsequently made by those skilled in the art that are also intended to be encompassed by the disclosed embodiments and the following claims.

What is claimed is:

1. A step extension platform for attachment to a ladder having a step comprising:

a main body having a platform for supporting a user thereon;

a first segmented portion secured to the platform by a first hinge, the first hinge having an axis of rotation extending along a width of the platform;

a second segmented portion secured to the first segmented portion by a second hinge, the second hinge extending along a length of the first segmented portion and having an axis of rotation extending along a width of the second segmented portion;

the platform, the first and second segmented portions being pivotal between an open storage position and a closed working position in which a step channel that is adapted to surround and accommodate the ladder step is formed; and a bracket secured to the second segmented portion and defining a space adapted to contain therein at least a portion of the ladder step, wherein the bracket has a first elongate portion adapted to extend between a ladder step top surface and under the platform when the step platform is in the closed working position.

2. The step extension platform as defined in claim 1, wherein the main body includes a first extension member translatably secured to the main body and translatable between a retracted and an extended position, wherein the first extension member projects beyond a width of the platform, the extension member having an upper surface adapted to directly support a user and an opposed bottom surface, the main body supporting the first extension member below the platform and beyond the ladder step wherein the first extension member bottom surface does not engage the ladder step.

3. The step extension platform as defined in claim 2, including a second extension translatably secured to the main body and translatable between a retracted and extended position, the first and second extensions extendable in opposed directions along a common longitudinal transverse axis.

4. The step extension platform as defined in claim 2, wherein the main body includes a housing depending from an undersurface of the platform, the housing having an interior in which the first extension member translates, the housing having a wall and the bracket resiliently engages the wall to secure the first and second segmented portions in the closed working position.

5. The step extension platform as defined in claim 3, wherein the first and second extension members terminate in an end member, each end member having a lug projecting therefrom, the lug adapted to engage at least an upper edge portion of the step and resisting rotation of the platform about the first hinge.

6. The step extension platform as defined in claim 4, wherein the wall forms an acute angle with the platform.

7. The step extension platform as defined in claim 1, wherein the bracket includes at least two spaced elements each defining the space for containing the at least a portion of the step.

8. The step extension platform as defined in claim 3, wherein the platform in the working position is generally parallel with the step surface and the first and second segmented portions form an enclosed step channel having open ends adapted to enclose a step therein.

9. The step extension platform as defined in claim 8, wherein the platform in the storage position is generally perpendicular to the step surface, and the first and second extension members are extended to engage the ladder side rails.

10. The step extension platform as defined in claim 8, wherein the first and second extension members each include an end plate secured to a distal end thereof, a latching member is pivotally secured to each endplate, the latching members include a portion extending outwardly beyond the end plate.

11. The step extension platform as defined in claim 1, further including a spacer disposed between the platform and the second segmented portion, the second segmented portion retaining the spacer below the ladder step.

12. The step extension platform as defined in claim 1, wherein the bracket is adapted to engage the step when the platform is in the storage position.

13. The step extension platform as defined in claim 1, wherein the second segmented portion includes tapered side edges.

14. A step extension platform for attachment to a ladder having a step, the step extension platform comprising:

- a main body having a platform for supporting a user thereon;
- a first extension member translatably secured to the main body and translatable between a retracted and an extended position within an extension member housing secured to a bottom surface of the platform, wherein the first extension member projects beyond a width of the platform;
- a first segmented portion secured to the platform by a first hinge, the first hinge having an axis of rotation extending along a width of the platform;
- a second segmented portion secured to the first segmented portion by a second hinge, the second hinge having an axis of rotation extending along a width of the platform;
- a bracket secured to the second segmented portion and defining a space adapted to contain at least a portion of the ladder step; and
- the first and second segmented portions being pivotal between an open storage position and a closed working position in which a step channel that is adapted to surround and accommodate the ladder step is formed, wherein the platform in the working position is generally parallel with a top step surface and the bracket resiliently engages the extension member housing, and the platform in the storage position is generally perpendicular to the top step surface and the bracket is out of engagement with the extension member housing and is adapted to remain secured to the ladder step.

15. The step extension platform as defined in claim 14, wherein the extension member includes a distal end and a latching member is pivotally secured to the distal end, the latching member includes a portion projecting outwardly beyond the end plate that is adapted to engage a ladder side rail.

16. The step extension platform as defined in claim 14, further including a spacer disposed between the platform and the second segmented portion, the spacer being adapted to be inserted below the ladder step.

17. A method of securing a step extension to a ladder having a step supported between two side rails comprising:

- obtaining a step extension having a main body having a platform for supporting a user thereon; a first segmented portion secured to the platform by a first hinge, the first hinge having an axis of rotation extending along a width of the platform; a second segmented portion secured to the first segmented portion by a second hinge, the second hinge having an axis of rotation extending along a width of the platform; the platform, the first and second segmented portions being pivotal between an open storage position and a closed working position to form a step channel adapted to surround and accommodate the ladder step; and a bracket secured to the second segmented portion and defining a space adapted to contain at least a portion of the ladder step;
- placing the bracket around a ladder step; and
- rotating the platform relative to the first and second segmented portion until the main body engages the bracket and the platform extends across a top of the ladder step and the platform is parallel to the top surface of the ladder step.

18. The method of claim 17, wherein the step extension includes a first and second extension members translatably secured to the main body and translatable between a retracted and an extended position wherein the first and second extension members project beyond a width of the platform, and extending the first and second extension members outwardly into engagement with the ladder side rails.

19. The method as defined in claim 17, including rotating the platform relative to the first and second segmented portion away from the step into a storage position and extending the first and second extension members into engagement with the ladder side rails.

20. The method as defined in claim 18, wherein the first and second extension members each include a latching member rotatably secured thereto, and rotating the latching members into engagement with the side rails.

21. A step extension platform for attachment to a ladder having a step, the step extension platform comprising:

a main body having a platform for supporting a user thereon;

a first segmented portion secured to the platform by a first hinge, the first hinge having an axis of rotation extending along a width of the platform;

a second segmented portion secured to the first segmented portion by a second hinge, the second hinge having an axis of rotation extending along a width of the platform;

the platform, the first and the second segmented portions being pivotal between an open storage position and a closed working position to form a step channel adapted to surround and accommodate the ladder step; and a bracket secured to the second segmented portion and defining a space adapted to contain therein at least a portion of the ladder step, and wherein upon rotation of the platform relative to the first and second segmented portion, the main body engages the bracket and the platform extends across a top of the ladder step wherein the platform is parallel to the top surface of the ladder step.

* * * * *